United States Patent
Jeong et al.

(10) Patent No.: US 9,952,715 B2
(45) Date of Patent: Apr. 24, 2018

(54) TOUCH INPUT SENSING APPARATUS WITH QUASI-DIFFERENTIAL EFFECT AND METHOD OF CONTROLLING THE SAME

(71) Applicant: SAMSUNG ELECTRO-MECHANICS CO., LTD., Suwon-si (KR)

(72) Inventors: Moon Suk Jeong, Suwon-si (KR); Yong Il Kwon, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 15/176,596

(22) Filed: Jun. 8, 2016

(65) Prior Publication Data
US 2017/0097716 A1  Apr. 6, 2017

(30) Foreign Application Priority Data
Oct. 6, 2015 (KR) .................. 10-2015-0140464

(51) Int. Cl.
*G06F 3/041* (2006.01)
*G06F 3/044* (2006.01)
*G06K 9/00* (2006.01)

(52) U.S. Cl.
CPC ............ *G06F 3/0416* (2013.01); *G06F 3/044* (2013.01); *G06K 9/0002* (2013.01); *G06K 9/0008* (2013.01); *G06F 2203/04104* (2013.01)

(58) Field of Classification Search
CPC ......... G06F 2203/04104; G06F 3/0416; G06F 3/044; G06K 9/0002; G06K 9/0008
See application file for complete search history.

(56) References Cited

U.S. PATENT DOCUMENTS

| | | | | |
|---|---|---|---|---|
| 2006/0273804 A1* | 12/2006 | Delorme | .................. | G01D 5/24 324/658 |
| 2009/0009486 A1* | 1/2009 | Sato | .................... | G02F 1/13338 345/174 |
| 2013/0016062 A1* | 1/2013 | Nihei | ...................... | G06F 3/044 345/174 |
| 2014/0176482 A1* | 6/2014 | Wei | ....................... | G06F 3/0418 345/174 |
| 2016/0026335 A1* | 1/2016 | Ahn | ...................... | G06F 3/0418 345/173 |

FOREIGN PATENT DOCUMENTS

| | | |
|---|---|---|
| JP | 2013-178848 A | 9/2013 |
| KR | 10-2014-0066600 A | 6/2014 |
| KR | 10-1496183 B1 | 2/2015 |

* cited by examiner

*Primary Examiner* — Ram Mistry
(74) *Attorney, Agent, or Firm* — NSIP Law (57) ABSTRACT

A touch input sensing apparatus includes a driver configured to output a signal to sensing electrodes, a sensor configured to sense a touch input from the sensing electrodes, and a reference signal generator configured to output a first clock signal to the driver and output a second clock signal to the sensor. The second clock signal frequency is k times greater than a frequency of the first clock signal. The reference signal generator is configured to synchronize the first clock signal with the second clock signal to delay a phase of the second clock signal is delayed from the first clock signal between 0 degrees and 180/k degrees, wherein k is a constant greater than 1.

17 Claims, 8 Drawing Sheets

TOUCH INPUT SENSING APPARATUS WITH QUASI-DIFFERENTIAL EFFECT AND METHOD OF CONTROLLING THE SAME

CROSS-REFERENCE TO RELATED APPLICATION

This application claims the benefit under 35 USC § 119(a) of Korean Patent Application No. 10-2015-0140464 filed on Oct. 6, 2015, with the Korean Intellectual Property Office, the disclosure of which is incorporated herein by reference.

BACKGROUND

1. Field

The following description relates to a touch input sensing apparatus and a method of controlling the touch input sensing apparatus.

2. Description of Related Art

A touch input sensing apparatus such as a touchscreen or a touchpad is a user interface attached to a display apparatus and provides a user with an intuitive user interface, and recently has been applied to various electronic devices such as cellular phones, mobile devices, personal digital assistants (PDA), and navigation devices.

The touch input sensing apparatus is typically applied as a user interface able to detect a difference between ridges and a valleys of a fingerprint and recognize individual fingerprints. A depth of the valleys of a fingerprint of a human from the ridges thereof may be as small as about 150 μm, and thus a touch input sensing apparatus for recognizing the fingerprint may require improved sensitivity as compared to existing touchscreens and the touchpads.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a touch input sensing apparatus includes a driver configured to output a signal to sensing electrodes, a sensor configured to sense a touch input from the sensing electrodes, and a reference signal generator configured to output a first clock signal to the driver and output a second clock signal to the sensor. The second clock signal frequency is k times greater than a frequency of the first clock signal. The reference signal generator is configured to synchronize the first clock signal with the second clock signal to delay a phase of the second clock signal is delayed from the first clock signal between 0 degrees and 180/k degrees, wherein k is a constant greater than 1.

The reference signal generator may be configured to set the frequency of the second clock signal twice the frequency of the first clock signal. The reference signal generator may be further configured to synchronize the first clock signal with the second clock signal such that a first period from a rising time of the first clock signal to a rising time of the second clock signal and a second period from a falling time of the second clock signal to a falling time of the first clock signal are substantially similar to each other.

The sensor may include a first switch connected to the sensing electrodes and configured to determine an on-off status of the first switch based on the second clock signal, a second switch connected to the first switch and configured to determine the on-off status of the second switch based on the second clock signal, a first capacitor connected to the first switch and connected to the second switch, and a first operational amplifier, wherein an input terminal of the first operation amplifier may be connected in parallel with the first capacitor and the second switch, and an output terminal is connected to the second switch and the first capacitor. The reference signal generator may be further configured to determine a time difference between a rising time of the first clock signal and a rising time of the second clock signal based on a capacitance of the first capacitor.

The touch input sensing apparatus may further include a differential integrator connected to an output terminal of the sensor and configured to generate a differential signal based on a single output of the sensor, wherein the differential integrator is configured to receive the first clock signal.

The sensing electrodes may include a first electrode connected to the driver and configured to receive the first clock signal, and a second electrode disposed to intersect the first electrode, connected to the sensor, and configured to vary a capacitance according to a touch input on a display or a touchpad.

In another general aspect, a method of controlling a touch input sensing apparatus, the method includes generating a first clock signal having a frequency, generating a second clock signal having a rising time different from a rising time of the first clock signal, a falling time different from a falling time of the first clock signal, and a higher frequency than the frequency of the first clock signal, outputting the first clock signal to a driver, receiving the first clock signal at first electrodes, outputting the second clock signal to a sensor connected to second electrodes intersecting the first electrodes.

The generating of the second clock signal may include setting the frequency of the second clock signal to a multiple of n, where n is a natural number, higher than the frequency of the first clock signals, and delaying a phase of the second clock signal by —90/n degrees in relation to a phase of the first clock signal, wherein n is a multiple of 2.

The applying of the first clock signal may include applying the first clock signal to a differential integrator connected to an output terminal of the sensor.

The method may further include determining an on-off status of a first switch of the sensor based on the second clock signal, and determining an on-off status of a second switch, connected to the first switch, based on the second clock signal.

The method further include determining a time difference between the rising time of the first clock signal and the rising time of the second clock signal based on a capacitance of a first capacitor connected in parallel to the second switch and an operational amplifier.

The method may further include generating a differential signal based on a single output of the sensor, and amplifying and filtering the signal output from the sensor.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Unless indicated otherwise, a statement that a first layer is "on" a second layer or a substrate is to be interpreted as covering both a case where the first layer directly contacts the second layer or the substrate, and a case where one or more other layers are disposed between the first layer and the second layer or the substrate.

Words describing relative spatial relationships, such as "below", "beneath", "under", "lower", "bottom", "above", "over", "upper", "top", "left", and "right", may be used to conveniently describe spatial relationships of one device or elements with other devices or elements. Such words are to be interpreted as encompassing a device oriented as illustrated in the drawings, and in other orientations in use or operation. For example, an example in which a device includes a second layer disposed above a first layer based on the orientation of the device illustrated in the drawings also encompasses the device when the device is flipped upside down in use or operation.

Though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the embodiments.

The terminology used herein is for describing particular embodiments only and is not intended to be limiting of the present disclosure. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Figure 1:
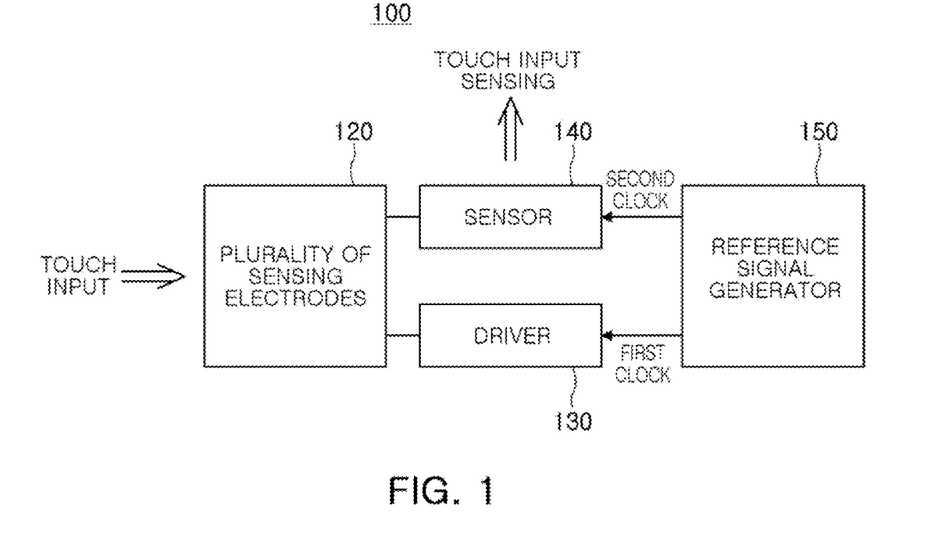
FIG. 1 is a diagram of a touch input sensing apparatus according to an embodiment.

FIG. 1 is an example of diagram of a touch input sensing apparatus 100 according to an embodiment. Referring to FIG. 1, the touch input sensing apparatus 100 includes a plurality of sensing electrodes 120, a driver 130, and a sensor 140.

For example, the touch input sensing apparatus 100 may be integrally provided with a display apparatus to have a high degree of light transmittance allowing an image displayed on the display apparatus to pass therethrough. Thus, the touch input sensing apparatus 100 may be a base substrate of a transparent film material such as polypolyetylene terephthalate (PET), polycarbonate (PC), polyethersulfone (PES), or polyimide (PI). Accordingly, the touch input sensing apparatus 100 can sense a touch input location on the display apparatus.

However, the touch input sensing apparatus 100 may not be provided with an integral display apparatus such as a touchpad of a notebook, or touchscreen of a tablet or other mobile device, and may be manufactured by simply patterning a conductive circuit as a sensing electrode on a substrate. Accordingly, the touch input sensing apparatus 100 may have a high degree of sensitivity so as to implement functions such as fingerprint recognition of a touch from a user's finger.

The plurality of sensing electrodes 120 sense an external touch input. Sensing a touch input may mean both sensing a touch input location and sensing the touch input itself. For example, the plurality of sensing electrodes 120 may be a transparent and electrically conductive material such as indium-tin oxide (ITO), indium zinc oxide (IZO), zinc oxide (ZnO), carbon nanotubes (CNT), or graphene, and may be a metal material such as silver (Ag), or copper (Cu). Thus, the plurality of sensing electrodes 120 may be attached to a display apparatus such as a touchscreen, or a touchpad, to sense a touch input location and detect a difference between ridges and valleys of a fingerprint of a touch inputting finger to enable the sensing apparatus 100 to recognize a fingerprint.

The driver 130 applies a first clock signal to the plurality of sensing electrodes 120. For example, the driver 130 may use a block, such as an up-converter, to boost the first clock signal to a higher voltage and then apply the first clock signal to the plurality of sensing electrodes 120.

The sensor 140 senses a touch input from the plurality of sensing electrodes 120. For example, the sensor 140 receives the first clock signal applied by the driver 130 through the plurality of sensing electrodes 120. In this regard, a characteristic of the first clock signal received by the sensor 140 may be different according to a touch input to the plurality of sensing electrodes 120. That is, the sensor 140 senses a touch input by sensing a change in characteristics of the first clock signal. The sensor 140 may operate at a frequency higher than that of the first clock signal. In this regard, an operating frequency of the sensor 140 may be a cycle of a repeating status change of the sensor 140. For example, when the sensor 140 includes a switching device, the operating frequency of the sensor 140 may be an on-off frequency of the switching device.

Noise corresponding to the operating frequency during a process of operating the sensor 140 may be introduced. In general, noise caused by the plurality of sensing electrodes 120 may be predominately distributed in a low frequency band due to a surrounding environment, a touch input characteristic, and a structural characteristic. When noise is construed as a specific signal, a size of a higher harmonic wave of the noise may be significantly smaller than a size of a basic wave. Therefore, as the operating frequency of the sensor 140 increases, the noise of the operating frequency introduced to the sensor 140 may be reduced. Accordingly, a signal-to-noise ratio (SNR) of the sensor 140 may be improved.

A reference signal generator 150 applies the first clock signal to the driver 130 and a second clock signal to the sensor 140. Accordingly, the driver 130 may operate according to the first clock signal, and the sensor 140 may operate according to the second clock signal. In this regard, a frequency of the second clock signal may be higher than that of the first clock signal. Thus, the operating frequency of the sensor 140 may be higher than that of the first clock signal.

A high frequency of a clock signal may cause a narrow pulse width of the clock signal. Thus, a pulse width of the second clock signal may be narrower than that of the first clock signal. Therefore, the reference signal generator 150 may synchornize the first clock signal and the second clock signal with each other such that a phase of the second clock signal is delayed in a range higher than zero degrees and lower than 180/k degrees with respect to a phase of the first clock signal. In this regard, k is a constant greater than 1.

Figure 4:
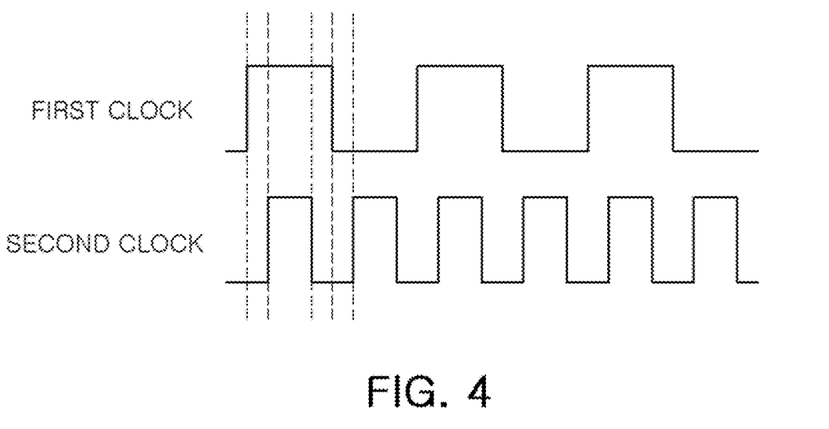
FIG. 4 is an example of a waveform diagram of a signal applied to a driver and a sensor of FIG. 3.

Accordingly, a number of times a value of the second clock signal changes between a rising time and a falling time of the first clock signal is at least 2 (see FIG. 4). As the number of times increaess, an SNR of the sensor 140 may be further improved.

As a ratio of a frequency of the second clock signal with respect to a frequency of the first clock signal increases, the number of times the value of the second clock signal changes between the rise and fall of the first clock signal also increases. As the number of times the rising time, or falling time, of the second clock signal is identical to the rising time, or falling time, of the first clock signal increases, the number of times the value of the second clock signal changes from the rising time to the falling time of the first clock signal may be reduced.

As a frequency of a clock signal increases, performance of the driver 130 and the reference signal generator 150 may deteriorate. Thus, when the rising time or falling time of the second clock signal is different to the rising time or falling time of the first clock signal, the SNR of the sensor 140 in relation to the same frequency may be improved.

Figure 2:
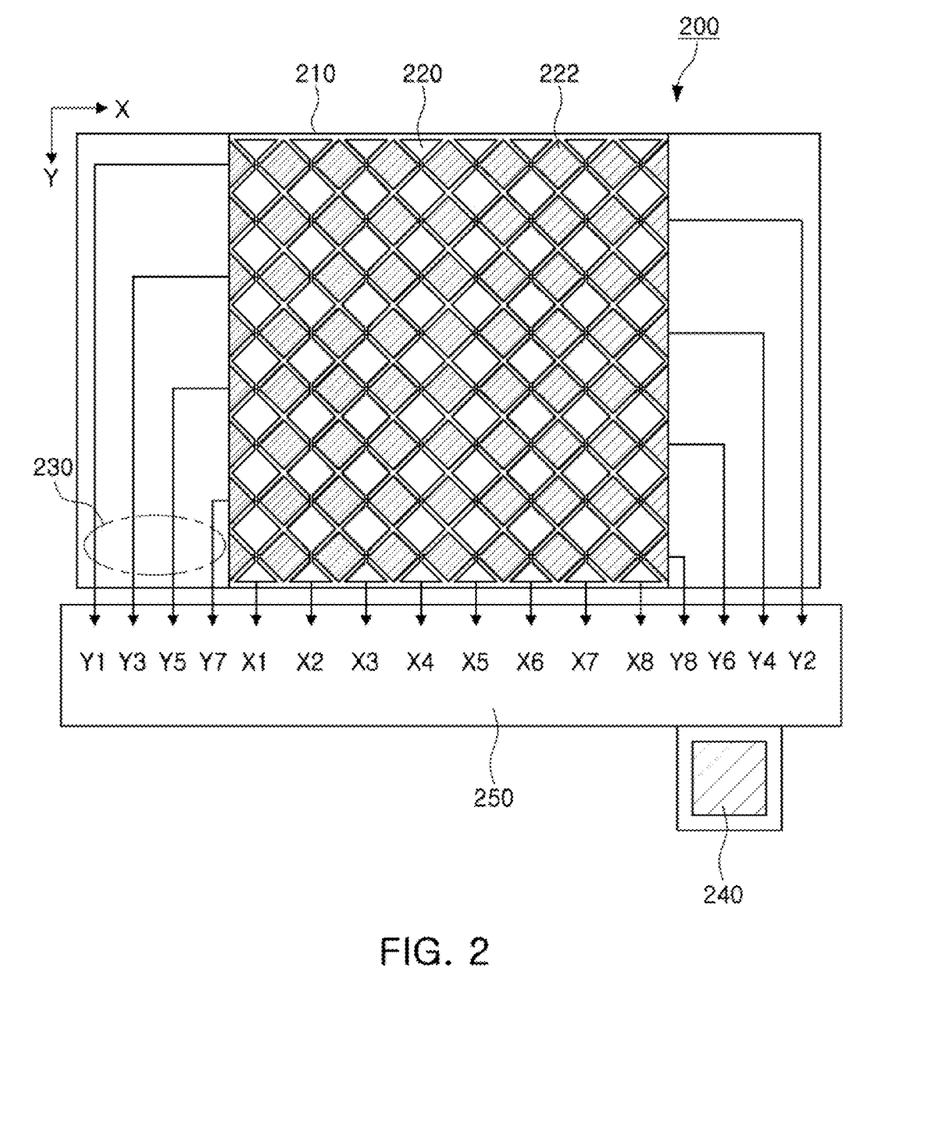
FIG. 2 is a diagram of an example of a structure of a plurality of sensing electrodes.

FIG. 2 is a diagram of an example of a structure of the plurality of sensing electrodes 120 of FIG. 1. Referring to FIG. 2, a touch input sensing apparatus 200 includes a base substrate 210 formed of a transparent material, sensing electrodes 220 formed on the base substrate 210, a wiring pattern 230 connected to the sensing electrodes 220, and a control circuit 240 electrically connected to the sensing electrode 220 through the wiring pattern 230. As shown in FIG. 2, a circuit substrate 250 in which the control circuit 240 is mounted is attached to a lower end portion of the base substrate 210, for example, through anisotropinc conductive film (ACF) bonding, and a bonding pad formed by exending the wiring pattern 230 is provided on a lower end portion of the base substrate 210. Thus, each sensing channel terminal of the control circuit 240 is electrically connected to the sensing electrode 220 through the wiring pattern 230.

The sensing electrode 220 may be formed as a transparent and conductive material such as ITO, ZnO, IZO, or CNT, as described above, and may have a predetermined pattern such that the control circuit 240 may determine a touch input interaction based on a second clock signal generated by the sensing electrode 220. The sensing electrode 220 shown in FIG. 2 may have a lozenge or diamond pattern. Unit electrodes 222 having a lozenge or diamond shape may be connected in a horizontal or vertical direction to form one sensing electrode 220. For convenience of description, the sensing electrode 220 extending in the horizontal direction is a first electrode, and the sensing electrode 220 extending in the vertical direction is a second electrode.

Both the first electrode and the second electrode have a shape in which the unit electrode 222 extends in the horizontal or vertical direction and may be disposed in different layers or in the same layer. When spaces between the first electrodes are filled, or occupied, by the second electrodes, and both the first electrodes and the second electrodes are disposed in the same layer, a bridge structure having a predetermined insulating material is disposed at an intersection point of the first and second electrodes in order to electrically separate, or insulate, the first electrode from the second electrode at the intersection point.

The first electrode and the second electrode are connected to separate wiring patterns as shown in FIG. 2. As shown in FIG. 2, when eight first electrodes and eight second electrodes are included in the touch input sensing apparatus 200, a total of 16 wiring patterns 230 are provided in a bezel region of the base substrate 210. The control circuit 240 includes at least 16 sensing channels, for example, X1 through X8 and Y1 through Y8, to be connected to each of the wiring patterns 230.

The control circuit 240 is electrically connected to the sensing electrode 220 through the sensing channels and each of the wiring patterns 230, and may include a driver applying the first clock signal to the sensing electrode 220 and a sensor for obtaining the second clock signal generated by the sensing electrode 220. The second clock signal is an electric signal in which self-capacitance generated between a touch input object, e.g., a user's finger, and the first electrode and the second electrode changes or in which mutual-capacitance generated between the first electrode and the second electrode changes by the touch input object. In particular, when a change in mutual-capacitance is sensed, the driver for applying the first clock signal to at least one of the first electrode and the second electrode may be included in the control circuit 240.

As an example, the control circuit 240 measures a voltage change of the sensing electrode 220 to determine a change in capacitance. The capacitance change determined from a voltage change amount is converted into a digital signal by an analog-to-digital converter (ADC) or a time-to-digital converter (TDC). The control circuit 240 determines coordinates of a touch input interaction, multiple touch inputes, a gesture, or a fingerprint using the converted digital signal.

The control circuit 240 may include a differential integrator for calculating a difference of the second clock signal obtained in a sensing channel connected to the adjacent sensing electrode 220. The difference of the second clock signal calculated by the differential integrator may be used for a main controller of the control circuit 240 to determine the touch input interaction. The differential integrator for calculating the difference of the second clock signal obtained in the adjacent sensing electrode 220 may be included in at least one of an analog signal and the digital signal of the control circuit 240.

Figure 3:
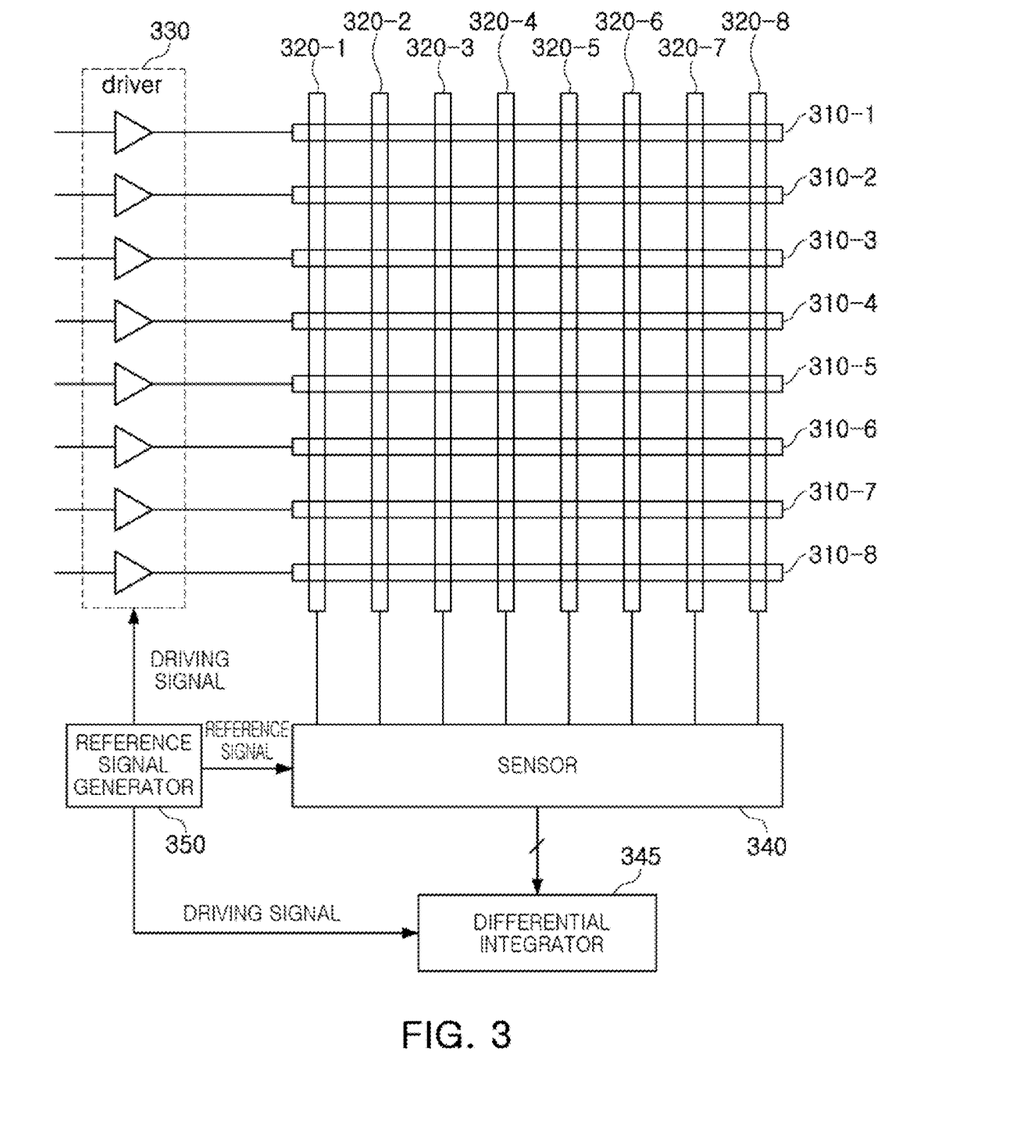
FIG. 3 is a diagram of a touch input sensing apparatus according to an embodiment.

FIG. 3 is a diagram of an example of a touch input sensing apparatus 300 according to an embodiment. Referring to FIG. 3, a driver 330 is connected to each of first electrodes 310-1 through 310-8 extending in a horizontal direction and a sensor 340 is connected to each of second electrodes 320-1 through 320-8 extending in a vertical direction. That is, although FIG. 3 assumes the touch input sensing apparatus 300 senses mutual-capacitance, as described above, the touch input sensing apparatus 300 according to an embodiment in the present disclosure may sense self-capacitance.

For example, the sensor 340 may include a charge pump circuit for measuring capacitance and is connected to a differential integrator 345 outputtting a voltage having a level corresponding to a difference of a second clock signal obtained from a sensing electrode.

An ADC converting a capacitance value measured as an analog value—usually measured in voltage—into a digital signal may be connected to the differential integrator 345.

A reference signal generator 350 applying a first clock signal to the driver 330 and applying a second clock signal to the sensor 340 is connected to the driver 330 and the sensor 340. The reference signal generator 350 generates the first clock signal and the second clock signal at the same time, thereby controlling a time difference between a rising time of the first clock signal and a rising time of the second clock signal so as not to go beyond a predetermined range.

FIG. 4 is a waveform diagram of a signal applied to a driver and a sensor of FIG. 3. Referring to FIG. 4, a second clock signal rises later than when a value of a first clock signal rises, and a time when the value of the second clock signal falls is sooner than a time when the value of the first clock signal falls.

As a number of times the value of the second clock signal changes from a rising time of the first clock signal to a falling time increases, a quasi-differential effect may further occur in the sensor, and a touch input sensitivity of a touch input sensing apparatus may be further improved.

Meanwhile, as a frequency of the second clock signal increases, the first clock signal output to the sensor through a sensing electrode may be distorted due to an R-C delay time of the sensor. Such a distortion may be generated by applying the first clock signal to the sensor through the sensing electrode before the second clock signal input to the sensor is settled. Thus, when the second clock signal precedes or is delayed, as compared to the first clock signal, the first clock signal output to the sensor through the sensing electrode may be received after the second clock signal is settled. Accordingly, a signal distortion sensed by the sensor may be reduced.

A delay time of the second clock signal is determined based on capacitance of a capacitor included in a charge pump circuit of the sensor. An R-C delay time is proportional to the capacitance of the capacitor. Thus, the delay time of the second clock signal is adjusted based on the R-C delay time.

When the second clock signal frequency is twice the first clock signal frequency, the reference signal generator controls a time when the second clock signal falls to be closer to the rise or fall of the first clock signal.

Figure 5:
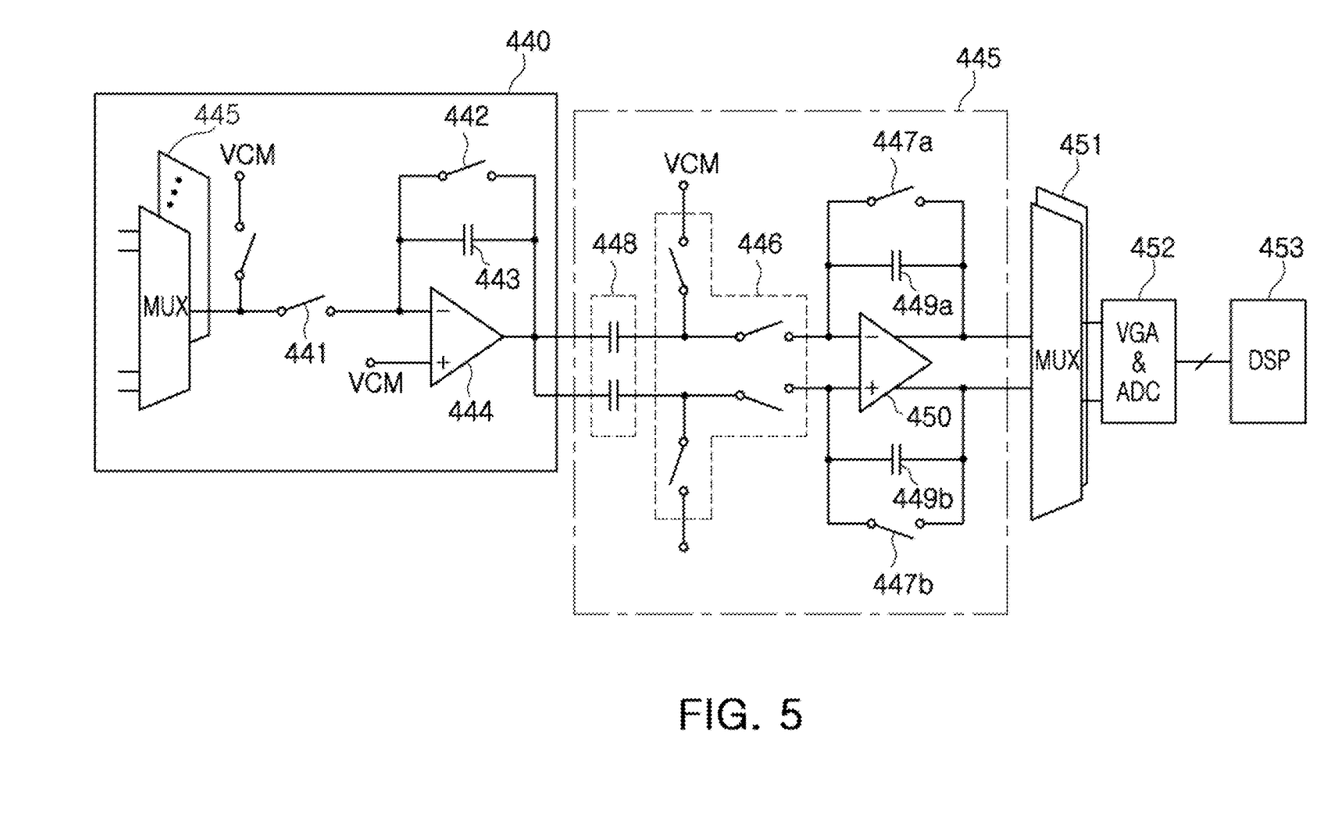
FIG. 5 is an example of a circuit diagram for the sensor and a differential integrator of FIG. 3.

FIG. 5 is a circuit diagram of a sensor 440 and a differential integrator 445 of FIG. 3.

Referring to FIG. 5, the sensor 440 includes a first switch 441, a second switch 442, a first capacitor 443, a first operational amplifier 444, and a multiplexer 445. The first switch 441 is connected to a plurality of sensing electrodes, through the multiplexer 445, and determines an on-off status based on a second clock signal. The second switch 442 is connected to the first switch 441 and determines the on-off status based on the second clock signal. The first capacitor 443 has one end connected to the first switch 441 and is connected in parallel with the second switch 442, and the first operational amplifier 444. The first operation amplifier 444 has an input terminal connected to the first switch 441 and is connected in parallel with the second switch 442 and the first capacitor 443.

Thus, the sensor 440 performs an integration operation according to switching operations of the first switch 441 and the second switch 442. For example, the second switch 442 may be in the off status when the first switch 441 is in the on status, and may be in the on status when the first switch 442 is in the off status. The sensor 440 converts a voltage corresponding to a change in capacitance that occurs in the sensing electrodes and amplifies the voltage by performing the integration operation.

Accordingly, a quasi-differential effect may occur in the sensor 440. An output voltage $V_{bo}$ of the sensor 440 according to the quasi-differential effect is shown in Equation 1 below. In this regard, $V_{in}$ denotes a voltage of the first clock signal, $C_m$ denotes mutual-capacitance between a first electrode and a second electrode of the plurality of sensing electrodes, and $C_{F1}$ denotes capacitance of the first capacitor 443.

$$V_{bo} = [(V_{in} * C_m)/C_{F1}]*2 \qquad [\text{Equation 1}]:$$

Referring to FIG. 5, a touch input sensing apparatus according to an embodiment further includes the differential integrator 445 connected to an output terminal of the sensor 440 and differentially integrates a single output of the sensor 440.

For example, the differential integrator 445 includes a plurality of second capacitors 448, a plurality of third switches 446, a plurality of fourth switches 447a and 447b, a second operation amplifier 450 and a plurality of third capacitors 449a and 449b. Each of the second capacitors 448 are separately connected to the output terminal of the sensor 440. The plurality of third switches 446 is connected to the plurality of second capacitors 448 and determines an on-off status based on the first clock signal. The plurality of fourth switches 447 is connected to the plurality of third switches 446 and determines an on-off status based on the first clock signal. The plurality of third capacitors 449 has one end connected to the plurality of third switches 446 and is connected to the plurality of fourth switches 447 in parallel. The second operational amplifier 450 has an input terminal connected to the plurality of third switches 446 and is connected in parallel to the plurality of fourth switches 447 and the plurality of third capacitors 449.

Thus, the differential integrator 445 performs the integration operation according to switching operations of the plurality of third switches 446 and the plurality of fourth switches 447. The sensor 440 acts as a buffer with respect to the differential integrator 445 by primarily performing a pre-integration operation based on the second clock signal.

An output voltage $V_{o\_p}(V_{o\_n})$ the differential integrator 445 is shown in Equation 2 below. Here, $V_{bo}$ denotes an input voltage of the differential integrator 445, $C_N$ denotes capacitance of the plurality of second capacitors 448, $C_{F2}$ denotes capacitance of the third capacitor 449, $V_{cm}$ denotes a DC bias of the differential integrator 445, and N denotes an integration number. The integration number of the differential integrator 445 shown in FIG. 5 is 2.

$$Vo\_p(Vo\_n)=[(V_{bo}*C_N)/C_{F2}]*N+V_{cm} \quad \text{[Equation 2]}$$

A touch input sensing apparatus according to an embodiment in the present disclosure includes a multiplexer 451, a signal processing circuit 452, and a digital signal processing circuit 453. The multiplexer is connected to the output terminal of the differential integrator 445. The analog signal processing circuit 452 is connected to the multiplexer 451 and performs amplification, filtering, and conversion operations on an analog signal. The digital signal processing circuit 453 is connected to the analog signal processing circuit 452 and processes a digital signal.

Figure 6:
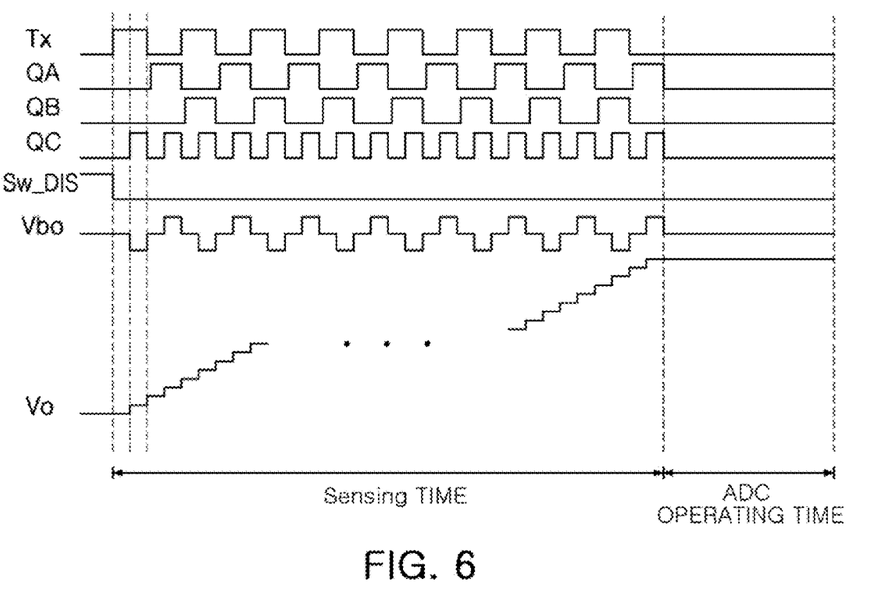
FIG. 6 is an example of a waveform diagram of the circuit of FIG. 5.

FIG. 6 is a waveform diagram of each node of FIG. 5. Referring to FIG. 6, $T_x$ denotes a first clock signal applied to a driver, $Q_A$ and $Q_B$ denote first clock signals applied to a differential integrator, $Q_C$ denotes a second clock signal applied to a sensor, $S_{W\_DIS}$ denotes a signal applied to a plurality of fourth switches, $V_{bo}$ denotes an output voltage of the sensor, and $V_o$ denotes an output voltage of the differential integrator.

Accordingly, the second clock signal operates 2 times faster than the first clock signal. The differential integrator may operate at the same frequency as a first clock signal frequency. A quasi-differential effect occurs in the output voltage of the sensor $V_o$.

Figure 7:
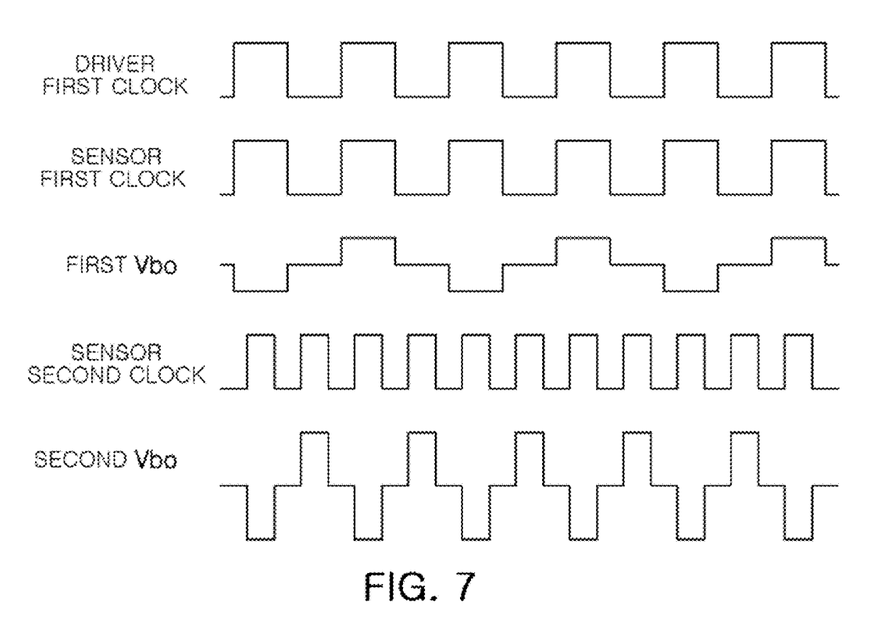
FIG. 7 is an example of a waveform diagram of Vbo according to a clock signal applied to a sensor of FIG. 5.

FIG. 7 is a waveform diagram of $V_{bo}$ according to a clock signal applied to a sensor of FIG. 5. Referring to FIG. 7, a value of a second $V_{bo}$ when a second clock signal is applied to a sensor is more than twice as much as a value of a first $V_{bo}$ when a first clock signal is applied to the sensor. Here, $V_{bo}$ is an output voltage of the sensor.

Figure 8:
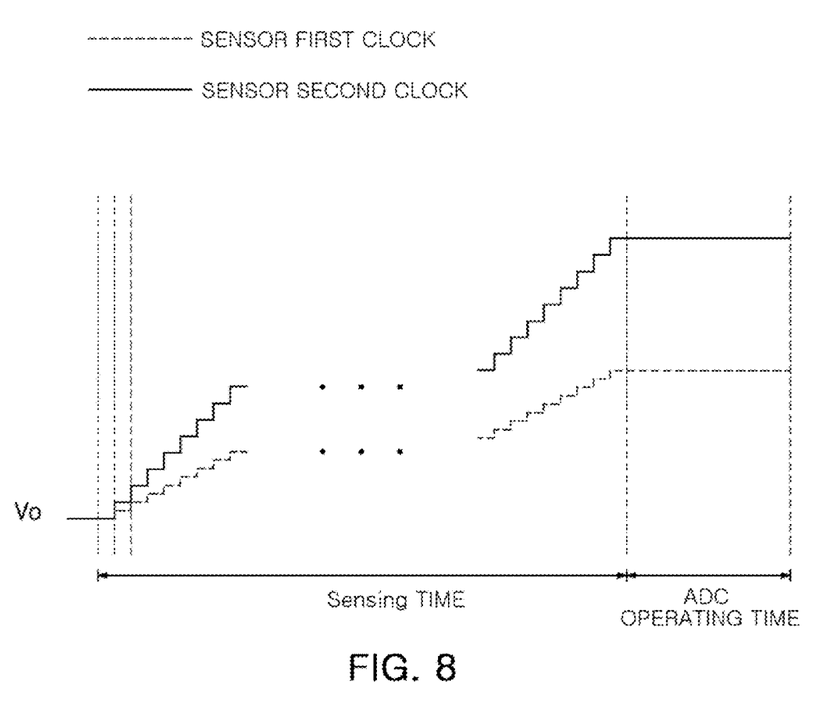
FIG. 8 is an example of a waveform diagram of Vo according to a clock signal applied to a sensor of FIG. 5.

FIG. 8 is a waveform diagram of $V_o$ according to a clock signal applied to a sensor of FIG. 5. Referring to FIG. 8, a rise value of $V_o$ with respect to time when a second clock signal is applied to a sensor is twice as much as a rise value of $V_o$ with respect to time when a first clock signal is applied to the sensor. Here, $V_o$ is an output voltage of the differential integrator.

That is, a touch input sensing apparatus according to an embodiment may increase a ratio of a variation of capacitance according to a touch input of a plurality of sensing electrodes with respect to a variation of an output voltage. Since noise of the output voltage is uniform when the variation of capacitance is uniform, the touch input sensing apparatus may improve an SNR.

A method of controlling the touch input sensing apparatus according to an embodiment is described below. The method includes controlling the touch input sensing apparatus described above.

Figure 9:
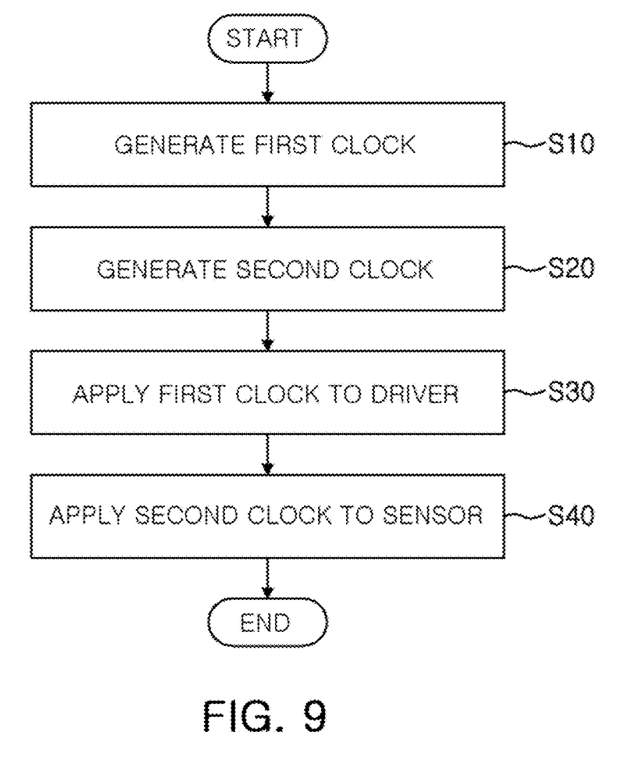
FIG. 9 is a flowchart of a method of controlling a touch input sensing apparatus according to an embodiment.

FIG. 9 is a flowchart of a method of controlling a touch input sensing apparatus according to an embodiment. Referring to FIG. 9, the method of controlling a touch input sensing apparatus according to an embodiment includes a first clock signal generating operation (S10), a second clock signal generating operation (S20), a first clock signal applying operation (S30), and a second clock signal applying operation (S40).

In the first clock signal generating operation (S10), a reference signal generator generates a first clock signal.

In the second clock signal generating operation (S20), the reference signal generator generates a second clock signal. Thus, the second clock signal has a rising time and a falling time that are different from a rising time and a falling time of the first clock signal and has a higher frequency than the first clock signal. For example, a frequency of the second clock signal may be an n multiple of a frequency of the first clock signal. A phase of the second clock signal may be delayed 90/n degrees in relation to a phase of the first clock signal. In this regard, n is a multiple of 2.

In the first clock signal applying operation (S30), the reference signal generator applies the first clock signal to a driver which applies the received first clock signal to one of a first electrode and a second electrode disposed to intersect each other. The first clock signal is output from an output terminal of a sensor to a differential integrator that differentially integrates a single output of the sensor.

In the second clock signal applying operation (S40), the reference signal generator applies the second clock signal to the sensor that senses a touch input from the other of the first electrode and the second electrode.

As set forth above, according to the above described embodiments, a touch input sensing apparatus may reduce an influence of noise that occurs during a touch input sensing process, thereby improving a touch input sensing sensitivity and may reduce an influence of a delay that occurs during the touch input sensing process, thereby reducing a touch input sensing distortion.

The apparatuses, units, modules, devices, and other components illustrated in FIGS. 1-8 that perform the operations described herein with respect to FIG. 9 are implemented by hardware components. Examples of hardware components include controllers, sensors, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIG. 9. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIG. 9 that perform the operations described herein with respect to FIG. 9 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

As a non-exhaustive example only, a touch input sensing apparatus as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device capable of wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

What is claimed is:

1. A touch input sensing apparatus comprising:
   a driver configured to output a signal to sensing electrodes;
   a sensor configured to sense a touch input from the sensing electrodes, receive a first clock signal applied by the driver, and a second clock signal from the reference signal generator; and
   a reference signal generator configured to output the first clock signal to the driver and output the second clock signal to the sensor,
   wherein the second clock signal frequency is k times greater than a frequency of the first clock signal,
   wherein the reference signal generator is configured to synchronize the first clock signal with the second clock signal to delay a phase of the second clock signal from the first clock signal between 0 degrees and 180/k degrees such that a first period from a rising time of a pulse of the first clock signal to a rising time of a pulse of the second clock signal and a second period from a falling time of the pulse of the second clock signal to a falling time of the pulse of the first clock signal are substantially similar to each other, and to set the frequency of the second clock signal to twice the frequency of the first clock signal,
   wherein k is a constant greater than 1.

2. The touch input sensing apparatus of claim 1, wherein the sensor comprises:
   a first switch connected to the sensing electrodes and configured to determine an on-off status of the first switch based on the second clock signal;
   a second switch connected to the first switch and configured to determine the on-off status of the second switch based on the second clock signal;
   a first capacitor connected to the first switch and connected to the second switch; and
   a first operational amplifier,
   wherein an input terminal of the first operation amplifier is connected in parallel with the first capacitor and the second switch, and an output terminal is connected to the second switch and the first capacitor.

3. The touch input sensing apparatus of claim 2, wherein the reference signal generator is configured to determine a time difference between a rising time of the first clock signal and a rising time of the second clock signal based on a capacitance of the first capacitor.

4. The touch input sensing apparatus of claim 2, wherein an output voltage $V_{bo}$ of the sensor is determined according to $V_{bo}=[(V_{in}*C_m)/C_{F1}]*2$, wherein $V_{in}$ denotes a voltage of the first clock signal, $C_m$ denotes a mutual-capacitance between a first electrode and a second electrode of the plurality of sensing electrodes, and $C_{F1}$ denotes a capacitance of the first capacitor.

5. The touch input sensing apparatus of claim 1, further comprising:
   a differential integrator connected to an output terminal of the sensor and configured to generate a differential signal based on a single output of the sensor, wherein the differential integrator is configured to receive the first clock signal.

6. The touch input sensing apparatus of claim 5, wherein the differential integrator comprises second capacitors, third switches, fourth switches, a second operation amplifier and third capacitors, wherein each of the second capacitors are separately connected to an output terminal of the sensor, third switches are connected to the second capacitors and determine an on-off status based on the first clock signal, and fourth switches are connected to the third switches and determine an on-off status based on the first clock signal.

7. The touch input sensing apparatus of claim 5, wherein the differential integrator comprises second capacitors, third switches, fourth switches, a second operation amplifier and third capacitors with one end connected to the third switches, the second operational amplifier having an input terminal connected to the third switches and connected in parallel to the fourth switches and the third capacitors.

8. The touch input sensing apparatus of claim 5, wherein the first clock signal is applied to the differential integrator.

9. The touch input sensing apparatus of claim 1, wherein the sensing electrodes comprise:
  a first electrode connected to the driver and configured to receive the first clock signal; and
  a second electrode disposed to intersect the first electrode, connected to the sensor, and configured to vary a capacitance according to a touch input on a display or a touchpad.

10. The touch input sensing apparatus of claim 1, wherein the reference signal generator generates the first clock signal and the second clock signal at the same time.

11. The touch input sensing apparatus of claim 1, wherein a delay time of the second clock signal is proportional to a capacitance of a first capacitor connected to the first switch and connected to the second switch.

12. The touch input sensing apparatus of claim 1, wherein an output voltage $V_{o\_p}(V_{o\_n})$ of the differential integrator is defined by $V_{o\_p}(V_{o\_n})=[(V_{bo}*C_N)/C_{F2}]*N+V_{cm}$, wherein $V_{bo}$ denotes an input voltage of the differential integrator, $C_N$ denotes a capacitance of the second capacitors, $C_{F2}$ denotes a capacitance of the third capacitors, $V_{cm}$ denotes a DC bias of the differential integrator, and N denotes an integration number.

13. A method of controlling a touch input sensing apparatus, the method comprising:
  generating a first clock signal having a frequency;
  generating a second clock signal comprising
    a rising time different from a rising time of the first clock signal,
    a falling time different from a falling time of the first clock signal, and
    a higher frequency than the frequency of the first clock signal;
  synchronizing the first clock signal with the second clock signal to delay a phase of the second clock signal from the first clock signal between 0 degrees and 180/k degrees such that a first period from a rising time of a pulse of the first clock signal to a rising time of a pulse of the second clock signal and a second period from a falling time of the pulse of the second clock signal to a falling time of the pulse of the first clock signal are substantially similar to each other, and to set the frequency of the second clock signal to twice the frequency of the first clock signal;
  outputting the first clock signal to a driver, the driver applying the first clock signal and outputting the first clock signal to a sensor connected to second electrodes intersecting the first electrodes;
  receiving the first clock signal at first electrodes; and
  outputting the second clock signal to the sensor.

14. The method of claim 13, wherein the applying of the first clock signal comprises applying the first clock signal to a differential integrator connected to an output terminal of the sensor.

15. The method of claim 13, further comprising:
  determining an on-off status of a first switch of the sensor based on the second clock signal; and
  determining an on-off status of a second switch, connected to the first switch, based on the second clock signal.

16. The method of claim 15, further comprising:
  determining a time difference between the rising time of the first clock signal and the rising time of the second clock signal based on a capacitance of a first capacitor connected in parallel to the second switch and an operational amplifier.

17. The method of claim 16, further comprising:
  generating a differential signal based on a single output of the sensor; and
  amplifying and filtering the signal output from the sensor.

* * * * *